United States Patent [19]

Sanderson et al.

[11] Patent Number: 4,544,589

[45] Date of Patent: Oct. 1, 1985

[54] SURFACING OF BEVERAGE VESSELS

[75] Inventors: Ronald D. Sanderson, Stellenbosch; Jurchens B. Badenhorst, Paarl, both of South Africa

[73] Assignee: Ko-Operatiewe Wijnbouers Vereniging Van Zuid-Afrika Beperkt, Suider Paarl, South Africa

[21] Appl. No.: 694,913

[22] Filed: Jan. 28, 1985

Related U.S. Application Data

[63] Continuation of Ser. No. 475,459, Mar. 15, 1983, abandoned.

[30] Foreign Application Priority Data

Mar. 25, 1982 [ZA] South Africa ........................ 82/2044

[51] Int. Cl.4 ............................ B05D 7/22; B32B 1/02

[52] U.S. Cl. ....................................... 428/35; 427/230; 427/239; 428/328; 428/551

[58] Field of Search .......................... 428/35, 328, 551; 427/230, 239

[56] References Cited

FOREIGN PATENT DOCUMENTS

| | | |
|---|---|---|
| 1276303 | 6/1972 | United Kingdom . |
| 1436344 | 5/1976 | United Kingdom . |
| 1505335 | 3/1978 | United Kingdom . |
| 1541807 | 3/1979 | United Kingdom . |

OTHER PUBLICATIONS

Pamphlet, Stay/Steel, Bulletin No. 101, U.S. Bronze Powders, Inc.

*Primary Examiner*—James R. Hoffman

*Attorney, Agent, or Firm*—Fitch, Even, Tabin & Flannery

[57] ABSTRACT

The invention provides a method of coating a surface comprising the application of one or more layers to a substrate to be coated, one of the layers being a barrier layer containing stainless steel flakes. The invention also provides an article having a surface coated according to the method. The layers include, in addition to the barrier layer, one or more of an impregnant, an undercoat and a reinforcement layer. The layers are applied in the order of the impregnant, the undercoat, the reinforcement layer, and the barrier layer.

12 Claims, No Drawings

SURFACING OF BEVERAGE VESSELS

This application is a continuation of application Ser. No. 475,459 filed Mar. 15, 1983.

This invention relates to a method of coating a surface, to an article having a coated surface, and to containers with coated surfaces.

According to the invention, a method of coating a surface comprising the application of one or more layers to a substrate to be coated, in which one of the layers is a barrier layer containing stainless steel flakes.

The method may comprise the application of the layers, in any suitable combination, the combination of layers depending upon the nature of the substrate to which the coating is applied.

The invention extends to an article having a surface coating comprising one or more layers, in which one of the layers is a barrier layer containing stainless steel flakes.

The layers of the coating may include, in addition to the barrier layer, one or more of an impregnant, an undercoat, and a reinforcement layer. The coating may comprise any suitable combination of the layers, but the layers are preferably applied in the order of the impregnant, the undercoat, the reinforcement layer, and the barrier layer.

In the case of a porous substrate, e.g., a porous cement or concrete substrate, the first layer of the coating to be applied to the substrate, conveniently is an impregnant. Typically, the impregnant may be applied in order to reduce water back pressure when the coating is applied to a substrate, such as the surface of an underground tank.

The impregnant may be a solvent- or water-based styrene acrylate emulsion, preferably of the type 4337W (water-based) or 4506M (solvent-based), commercially available from Bevaloid S A (Pty) Ltd.

The undercoat of the coating may be applied over the impregnant or directly to the substrate. Depending upon the nature of the substrate, the undercoat may be either a low to medium modulus primer, or a cement-metal primer, or a plastics primer.

In the case of a cement or concrete substrate which is susceptible to structural or thermal movement, e.g., the walls of a cement or concrete tank, the undercoat employed may be the low to medium modulus primer. The low to medium modulus primer preferably has an extensibility which could be maintained without substantial deterioration thereof for more than about 20 years. The purpose of this primer would be to enhance the crack-bringing properties of the coating.

The low to medium modulus primer may be selected from the group consisting of an elastomeric urethane, rubber latex or, preferably, a water-based styrene acrylate emulsion, of the type 4506M, commercially available from Bevaloid S A (Pty) Ltd. The Bevaloid product may be viscosity-modified and may be shear stabilized by ammonia addition. Curing may be effected by zinc acetate addition to the ammonia-modified product. The primer should have good tack and extensibility.

Alternatively, the undercoat may be the cement-metal primer in cases where crack-bridging is not a problem, e.g., where the substrate is a new or refurbished cement or concrete surface, or a shot-blasted or sand-blasted metal surface, e.g., of a steel tank. The cement-metal primer may comprise a standard grade epoxy and a curing agent, preferably a cycloaliphatic amine, with various fillers, flow modifiers and other additives as desired.

Alternatively, where the substrate is a fiberglass or reinforced plastics tank, the undercoat may be the plastics primer. The plastics primer may also be applied for the refurbishing of an existing polymeric coating where the coating had previously been applied to the substrate.

The plastics primer may comprise either a standard water-dispersible epoxy with a hardener, or a vinyl ester polymer. Conveniently, the epoxy is XB 3010, and the hardener is XB 3940, both manufactured by Ciba-Geigy.

The reinforcement layer may comprise a fiberglass sub-layer, a matrix binder and a surfacing tissue sub-layer. The reinforcement layer may be applied to a substrate having a low strength, e.g., which cannot support the forces exerted by the rigid barrier layer applied thereto; or where movement of the substrate, e.g., a cement tank, would cause cracking of the rigid barrier layer, such as where the layer is applied directly to the undercoat, the impregnant or the substrate; or where the substrate is damaged. In the latter instance, a corroded metal, e.g., steel, tank may be repaired by refurbishing it with the reinforcement layer.

The fiberglass sub-layer of the reinforcement layer may comprise one or more fiberglass mats. Each of the mats may have a preferred mass per unit area of about 300 $g/m^2$. The keying of the mats may be dependent upon the matrix binder to be used, and the mass per unit area of the mats may depend upon the amount of reinforcement required. For example, when a tank of steel or another metal is cracked or severely corroded, more than one fiberglass mat may be used. The fiberglass mats are preferably powder-coated (or bonded).

The matrix binder of the reinforcement layer may comprise a polyester or epoxy used with a curing system. Preferably, the polyester is a non-tainting Crystic 491 polyester supplied by NCS Plastics. The epoxy system is preferably the same as that used as matrix in the barrier layer, described hereunder.

The surfacing tissue sub-layer of the reinforcement layer may comprise synthetic plastic fibers bound together by a second matrix binder. The synthetic plastics fibers are preferably polyacrylonitrile fibers, but alternatively polyester fibers may be used. Preferably, the second matrix binder for the surfacing tissue sub-layer is similar to the matrix binder described above as part of the reinforcement layer. The surfacing tissue sub-layer may be employed to improve the surface texture of the coating.

The Applicant recommends that whenever the reinforcement layer is applied as part of the coating, the surfacing tissue sub-layer should form part of the reinforcement layer.

The barrier layer may include a mixture of an epoxy novolak, a general-purpose epoxy, and a curing agent, the epoxy novolak having a functionality greater than 2. If required, up to 100% of a difunctional epoxy may be added thereto to reduce the viscosity. Preferably, no more than 75% of the difunctional epoxy is added. A convenient curing agent may be HY943 or LMB29846 from Ciba-Geigy, or J54/3 from Shell, or a suitable cycloaliphatic amine.

The Applicant has found that the epoxy novolak EPN 1139 used with the curing agent HY943 (both available from Ciba-Geigy) performs adequately. Mixtures containing an epoxy novolak, such as EPN1139 from Ciba-Geigy, and difunctional bisphenol A epoxy, used with a cycloaliphatic amine curing agent, also perform satisfactorily.

The barrier layer may contain up to 70% (by weight) stainless steel flakes, a preferable range being between 10% and 20% (by weight), about 20% (by weight) being the presently preferred amount. The flakes are preferably grade 316 stainless steel.

The barrier layer may be applied by any suitable method in separate layers of about 500 microns, but multiple, more thinly applied layers may be used. Preferably, the layers are applied by hot spray with a two or three component mixing spray gun head. Diluents, such as alcohols, acetone, methyl ethyl ketone, and the like, may be admixed to the epoxy novolac to reduce the viscosity and to improve the application thereof. The use of such diluents is, however, not preferred.

When the coating is required to have a smooth glossy surface, the coated surface of the article may include a final coat of the barrier layer, without the reinforcing stainless steel flakes, e.g., the epoxy novolac and curing agent.

The invention extends further to a container, having coated surfaces as described above. Such containers have specific application in the beverage industry and, more particularly, in the wine industry, for storage of all products of the grape.

We claim:

1. A method of coating an internal surface of an article to form a coating thereon which is suitable for contact with a beverage, said method comprising the steps of:

(i) applying at least one base layer to the article, (ii) thereafter applying a barrier layer over the base layer, said barrier layer comprising (a) a difunctional epoxy resin, (b) an epoxy novolak resin having a functionality greaten than 2, (c) a cycloaliphatic amine, and, (d) stainless steel flakes in an amount of between about 10% by weight and about 70% by weight, calculated on the total weight of the constituents (a), (b) and (c), and (iii) permitting the barrier layer to cure to form a solid coating.

2. A method as claimed in claim 1, wherein application of the base layer comprises applying a primer layer selected from the group consisting of an elastomeric urethane, a rubber latex and a water-based styrene acrylate emulsion.

3. A method as claimed in claim 1, wherein application of the base layer comprises applying a primer comprising an epoxy resin and a curing agent therefor.

4. A method as claimed in claim 1, wherein application of the base layer comprises applying a plastics primer selected from the group consisting of vinyl ester polymers and water-dispersible epoxy resins together with hardeners therefor.

5. A method as claimed in claim 1, wherein application of the base layer comprises the steps of applying a fiberglass sub-layer and a first matrix binder for binding the fiberglass sub-layer to the surface of the article, and applying a surfacing tissue sub-layer of synthetic plastics fibers to the fiberglass sub-layers and a second matrix binder for binding the surfacing tissue sublayer to the glass-fiber sub-layer.

6. A method of coating an internal surface of an article to form a coating thereon which is suitable for contact with a beverage, said method comprising the steps of:

(i) applying at least one base layer to the article, (ii) thereafter, applying a barrier layer over the base layer, said barrier layer comprising (a) a difunctional epoxy resin, (b) an epoxy novolak resin having a functionality greater than 2, (c) a cycloaliphatic amine, and, (d) stainless steel flakes in an amount of between about 10% by weight and about 70% by weight, calculated on the total weight of the constituents (a), (b) and (c), (iii) permitting the barrier layer to cure to form a solid coating, (iv) applying a further layer comprising (a) a difunctional epoxy resin (b) an epoxy novolak resin having a functionality greater than 2, and (c) a cycloaliphatic amine, and (v) permitting the further layer to cure to form a solid coating.

7. An article having an internal coating thereon which is suitable for contact with a beverage, said coating comprising (i) at least one base layer (ii) a barrier layer provided on said base layer, said barrier layer comprising the cured product of (a) a difunctional epoxy resin (b) an epoxy novolak resin having a functionality greater than 2, (c) a cycloaliphatic amine, and (d) stainless steel flakes in an amount of between about 10% by weight and about 70% by weight, calculated on the weight of constituents (a), (b) and (c).

8. An article as claimed in claim 7 wherein the article is a cementitious article and wherein the base layer comprises a primer layer selected from the group consisting of an elastomeric polyurethane polymer, a rubber latex polymer and a styrene acrylate polymer.

9. An article as claimed in claim 7, wherein the base layer is a cured epoxy resin.

10. An article as claimed in claim 7, wherein the article is of fiberglass or a reinforced plastics material, and wherein the base layer comprises a hardened plastics primer selected from the group consisting of hardened vinyl ester polymers and epoxy resins.

11. An article as claimed in claim 7, wherein the base layer comprises a fiberglass sub-layer bonded to the surface of the article by a first matrix binder, and a surfacing tissue sub-layer of synthetic plastics fibres bonded thereto by a second matrix layer.

12. An article having a coating thereon, which is suitable for contact with a beverage, said coating comprising (i) at least one base layer (ii) a barrier layer provided on said base layer, said barrier layer comprising the cured product of (a) a difunctional epoxy resin, (b) an expoxy novolak resin having a functionality greater than 2, (c) a cycloaliphatic amine, and (d) stainless steel flakes in an amount of between about 10% by weight and about 70% by weight, calculated on the weight of constituents (a), (b) and (c), and (iii) on the barrier layer, a further layer comprising the cured product of
(a) a difunctional epoxy resin,
(b) an epoxy novolak resin having a functionality greater than 2, and
(c) a cycloaliphatic amine.

* * * * *

UNITED STATES PATENT AND TRADEMARK OFFICE
CERTIFICATE OF CORRECTION

PATENT NO. : 4,544,589

DATED : October 1, 1985

INVENTOR(S) : SANDERSON, Ronald D. and BADENHORST, Jurchens B.

It is certified that error appears in the above-identified patent and that said Letters Patent is hereby corrected as shown below:

Col. 1, Line 54-55, change "crack-bringing" to --crack-bridging--.

Col. 3, Line 19, change "novolac" to --novolak--.

Col. 3, Line 25, change "novolac" to --novolak--.

Col. 4, Line 2, change "glass-fibre" to --fiberglass--.

Signed and Sealed this

*Eleventh* Day of *February 1986*

[SEAL]

*Attest:*

DONALD J. QUIGG

*Attesting Officer* *Commissioner of Patents and Trademarks*